United States Patent [19]

Balmat

[11] 4,042,668

[45] Aug. 16, 1977

[54] SO$_2$ REMOVAL PROCESS

[75] Inventor: Jean Louis Balmat, Kennett Square, Pa.

[73] Assignee: E. I. Du Pont de Nemours and Company, Wilmington, Del.

[21] Appl. No.: 622,749

[22] Filed: Oct. 15, 1975

[51] Int. Cl.$^2$ .................... C01B 17/00; C01B 17/72; C01B 17/68
[52] U.S. Cl. .................... 423/243; 423/522; 423/533
[58] Field of Search ............... 423/243, 244, 242, 522, 423/533, 534

[56] References Cited

U.S. PATENT DOCUMENTS

| | | | |
|---|---|---|---|
| 3,829,457 | 8/1974 | Berrotti et al. | 423/533 |
| 3,923,954 | 12/1975 | Petrey et al. | 423/243 |
| 3,937,795 | 2/1976 | Hasibe | 423/243 |

*Primary Examiner*—Earl C. Thomas
*Assistant Examiner*—Gregory A. Heller

[57] ABSTRACT

Sulfur dioxide is removed from oxygen-containing gases by contacting them with water having dispersed therein a chelate of manganese and a β-diketone. The sulfur dioxide is oxidized to SO$_3$ and absorbed into the water thus forming sulfuric acid.

8 Claims, No Drawings

SO₂ REMOVAL PROCESS

BACKGROUND OF THE INVENTION

1. Field of the Invention

The invention relates to the abatement of sulfur dioxide ($SO_2$) from oxygen-containing gas streams and is particularly useful for the removal of $SO_2$ from sulfuric acid plant effluent gases.

2. Description of the Prior Art

As a result of the current world-wide concern for our ecology, considerable emphasis has been laid upon protecting our environment from excessive or harmful pollution by industrial wastes of all kinds. Because of the economic importance of so many processes and operations, both domestic and industrial, which necessarily utilize substantial amounts of sulfur, one of the areas of major concern has been pollution of the air with sulfur-containing gases. Chief among these are industrial steam boilers, ore smelters and sulfuric acid plants, all of which produce substantial volumes of gases containing sulfur compounds, particularly $SO_2$.

Because of the economic size of the problem, sulfur removal technology has received increasing technical attention and a wide variety of removal processes have been suggested. These may be categorized as follows:

1. Dry processes in which $SO_2$ is absorbed by contact with solid metal oxides such as lime and limestone;
2. Dry processes in which $SO_2$ is absorbed by contact with molten salt or activated carbon;
3. Wet processes in which the $SO_2$ is absorbed by scrubbing the gas with an aqueous solution or slurry of solid absorbent material. Principal absorbents include the alkalis (sodium and ammonium hydroxide), alkaline earths (calcium and magnesium oxides) and weak sulfuric acid; and
4. Catalytic oxidation processes in which the $SO_2$-containing gas cleaned of dust is passed over a solid oxidation catalyst at high temperature to produce $SO_3$ which is condensed with moisture to form concentrated $H_2SO_4$.

A still further process involves treating the $SO_2$ with an aqueous solution of hydrogen peroxide or other peroxidic acids to oxidize the $SO_2$ to $SO_3$ which is then absorbed. Furthermore, such processes can be combined, e.g. the catalytic oxidation of $SO_2$ followed by treatment with peroxidic compounds to obtain quite complete $SO_2$ abatement.

While such processes are useful in many situations, they are not practical in many instances for a variety of reasons. For example, the heterogeneous catalytic processes do not achieve adequate removal at economic flow rates. The dry processes may present serious solids disposal problems or serious regeneration problems. The dispersed or dissolved absorbent may present similar problems of liquid solution disposal. Any of the processes may present problems of economics at high abatement levels. Thus, there is considerable incentive for the development of $SO_2$ abatement processes having improved economics at high standards of $SO_2$ removal.

BRIEF DESCRIPTION OF THE INVENTION

Many of the problems of the prior art are overcome by the present invention which is a process for the removal of $SO_2$ from an oxygen-containing gas stream comprising contacting the gas stream with a liquid stream of water containing dispersed therein a catalytic amount of a chelate of manganese and a β-diketone. The chelate catalyzes oxidation of the $SO_2$ to $SO_3$ which is absorbed into the water thus forming sulfuric acid and separating the nonabsorbed gas from the absorbent. The concentration of sulfuric acid dissolved in the water is less than about 40% by weight, basis total solution. Suitable β-diketones correspond to the structure

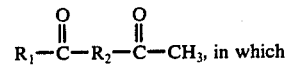

in which $R_1$ is a $C_{1-10}$ hydrocarbyl radical selected from the group consisting of alkyl, cycloalkyl, aryl, aralkyl, alkaryl and $C_{2-4}$ alkylene which when covalently bonded to a carbon atom from $R_2$ forms a cycloalkyl ring and $R_2$ is a bivalent hydrocarbyl radical selected from the group consisting of methylene and ethylidene.

DETAILED DESCRIPTION OF THE INVENTION

The water-dispersible chelates used in the invention are prepared quite easily merely by dissolving a source of manganese ions in water and admixing the water-soluble β-diketone therewith. The source of manganese ions can be any water-soluble salt of manganese such as manganous sulfate, manganous nitrate, manganous acetate, the manganous hydrogen phosphates and halides or mixtures of such salts. It is preferred that the ratio of moles of β-diketone to atoms of manganese (ligand ratio) be at least about 1. Furthermore, it is preferred that the ligand ratio be at least 4.

Though the exact composition of the resultant chelate is not known with certainty, it is believed that at ligand ratios of 2 to 3, the chelate corresponds to the following bicyclic structure:

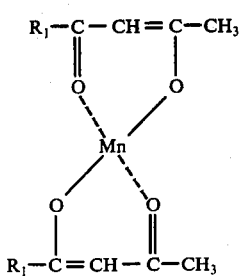

However, at ligand ratios of at least 3 and above, especially at 4 and higher, it is believed that the water-soluble chelate is a mixture of both bicyclic chelates, as above, and tricyclic chelates as follows:

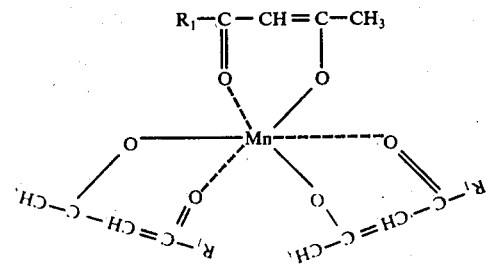

Though ligand ratios of greater than 4 are operable in the practice of the invention, they seem to offer no advantage over ligand ratios of about 4. While the ligand ratio is important, nevertheless the order of mixing of the components thereof is not critical so long as they are thoroughly mixed. Likewise, the treating temperature is not critical so long as the water remains liquid and so long as the vaporization or decomposition temperature of the ligand source is not exceeded.

Because completely water-soluble chelates have been shown to give outstanding activity, they are preferred. However, less soluble chelates have been shown to be active and it appears that high surface area water-insoluble chelates will be effective, especially if they are well dispersed.

Alternatively, various polymeric chains can be coupled to either the $R_1$ or the $R_2$ moiety of the $\beta$-diketone. Upon reaction with the manganese, these would produce a high molecular weight water insoluble chelate. Such long chain chelates would be easily separated from the water phase. Thus, heterogeneous phase operation of the process with either dispersed solid chelate particles or with a fixed bed of such catalyst is foreseeable.

In addition, it has been found that the $\beta$-diketones suitable in the practice of the invention contain at least one methyl group adjacent to a carbonyl group. Thus, suitable $\beta$-diketones include 2,4-pentanedione (acetylacetone), 3,5-heptanedione, 2-acetylcyclohexanone, 1-phenyl-1,3-butanedione, 1-tert.butyl-1,3-butanedione, 1-(ortho-methylphenyl)-1,3-butanedione, 1-phenyl-2,4-pentanedione, 8,8-dimethyl-2,4-decanedione and 3-methyl-2,4-pentanedione.

Neither temperature nor pressure of the process are particularly critical insofar as the theoretical operability of the process is concerned so long as the absorbent is maintained in the liquid phase. However, it will be well recognized that both the rate and degree of absorption will be higher at lower temperatures and higher pressures. Thus, the selection of particular operating conditions will be governed largely by process and equipment economics. Ordinarily, however, the process will be conducted at 10°-70° C. and preferably 10°-50° C. More often, the process will be conducted at 20°-50° C.

The concentration of chelate to be used in the absorbent must be sufficient to assure contact with the $SO_2$ in the feed gas under the particular contacting conditions. In homogeneous operations, 50 to 1,000 ppm by weight chelate are sufficient, from about 100 to 750 ppm being preferred.

The nature of the contacting operation is not critical. Nevertheless, the extent and intimacy of contact is quite important to the economic viability of the process. Thus, when an homogeneous absorbent is used, it is preferred to employ continuous countercurrent flow of the gas through the absorbent solution. A particularly effective type of countercurrent contacting involves passing the gas as a discontinuous phase of finely divided bubbles through a continuous phase of the absorbent liquid. In laboratory studies this type of operation is obtained by passing the gas upward through a frit sparger having a layer of the scrubbing liquid thereon.

In the usual practice of the invention, the sulfuric acid-containing scrubbing liquid which results from the $SO_2$ absorption after separation from the non-absorbed gas will be withdrawn and recycled to the contacting apparatus (scrubber). Though it will be obvious that the highest absorptive gradient is obtained with water alone, nevertheless the scrubbing solution can be recycled repeatedly to the process until quite substantial concentrations of acid have been built up. In particular, it has been found that scrubbing solutions containing up to about 40% by weight $H_2SO_4$ are effective. However, the absorbent solution has a longer and more effective life if the acid concentration is maintained below about 20% by weight $H_2SO_4$. Though scrubbing solutions having an acid concentration greater than 40% are no longer directly useful in the process, they are nevertheless of sufficient purity that they may be used for their acid values in the manner of conventional acid solutions. (Acid concentrations are based on total solution weight.)

The particular method for disengaging the nonabsorbed gases from the absorbent is, of course, not critical and does not constitute a critical aspect of the invention. Conventional gas/liquid contacting devices well known by those skilled in the art can be used or readily adapted for use in carrying out the process of the invention.

The advantages of the invention are illustrated by the following examples.

EXPERIMENTAL APPARATUS

The experimental absorber used consisted of ten-inch high glass cylinder having a diameter of two inches. A gas inlet line was located in the side of the vessel just above the bottom and a gas outlet line was located in the side of the vessel near the top. Affixed above the gas inlet was a one-eighth inch thick plate of medium gas frit having the same diameter as the inside diameter of the absorber sealed to avoid any bypassing of gas between the rim of the plate and the vessel wall. In each of the test runs, absorbent solution was placed in the bottom of the absorber to a level sufficient to cover the frit plate with liquid. All experiments were conducted at room temperature and one atmosphere outlet pressure. However, where applicable, all results were converted to standard temperature and pressure (STP) of 0° C and 760 mm Hg.

EXAMPLE 1

Using the above-described apparatus, a series of test runs was conducted in which $SO_2$ was removed from a simulated $H_2SO_4$ plant tail gas by absorption through a 35% by weight aqueous solution of $H_2SO_4$ containing a chelate compound formed by dissolving manganese sulfate and a ligand source in the acid solution. The experimental conditions and results are given in Table I below:

TABLE I

Experimental Conditions:
Absorbent: 35% wt. aqueous $H_2SO_4$, 250 ml, 25° C
Gas Feed: 4000 ppm $SO_2$, 10% $O_2$, 89.6% $N_2$, 0.5 liter/minute STP
Ligand Ratio: 2:1

| Ligand | $Mn^{+2}$ Concentration (ppm) | $SO_2$ Removal (% Vol.) |
|---|---|---|
| None | 300 | 0 |
| Acetlyacetone | " | 90+ |
| Methyl isobutyl ketone | " | 0 |
| Cyclohexanone | " | 0 |
| Ethylene diamine tetraacetic acid | " | 0 |
| Malonic acid | " | 0 |
| Oxalic acid | " | 0 |

Of the ligand sources tested, only those compounds having ketone type dicarbonyl groups were effective. Compounds containing nonketone dicarbonyl groups were ineffective.

EXAMPLE 2

A further series of test runs were made in the same manner as Example 1 in which the removal of $SO_2$ using a wide variety of diketone chelates was observed. The experimental conditions and results are given in Table II below:

TABLE II

Experimental Conditions:
Absorbent: 35% wt. $H_2SO_4$, 25 ml, 25° C
Gas Feed: 4000 ppm $SO_2$, 10% $O_2$, 89.6% $N_2$, 1.0 liter/minute STP
Ligand Ratio: 4:1

| Ligand | $Mn^{+2}$ Concentration (ppm) | $SO_2$ Removal (% vol.) |
|---|---|---|
| 2,4-pentanedione | 300 | 45 |
|  | 600 | 51 |
| 3,5-heptanedione | 300 | 28 |
|  | 600 | 37 |
| 2-acetylcyclohexanone | 300 | 45 |
| 1-phenyl-1,3-butanedione* | 300 | 50 |

*A ligand ratio of only 1 was used because of the limited solubility of the ligand in 35% $H_2SO_4$.

The results of this experiment confirmed the findings of Example 1 that the $Mn^{+2}$ chelates formed from ketone-type dicarbonyl groups capable of forming 6-membered rings are effective.

EXAMPLE 3

Using the same conditions as in Example II, a series of tests was made to determine whether complexes of ions other than $Mn^{+2}$ would be active for $SO_2$ oxidation. 2,4-pentanedione was used as the ligand source. Each of the complexes was formed in the same manner as the manganese complexes, i.e. by dissolving the water-soluble sulfate of each metal and the ligand source in the acid solution. Surprisingly, of the six divalent ions tested (atomic numbers 24-29), only the manganese was active, as is shown by the data in Table III below.

TABLE III

| Metal Ion | Atomic Number | $SO_2$ Removal (%) |
|---|---|---|
| $Cr^{+2}$ | 24 | 0 |
| $Mn^{+2}$ | 25 | 45 |
| $Fe^{+2}$ | 26 | 0 |
| $Co^{+2}$ | 27 | 0 |
| $Ni^{+2}$ | 28 | 0 |
| $Cu^{+2}$ | 29 | 0 |

EXAMPLE 4

Again using the same conditions as in Example 2, an extensive series of ligands was tested to help define the area of operable ligands. The $Mn^{+2}$ complex of each of the following compounds was found to be inactive for $SO_2$ oxidation at these conditions.

5,5-dimethyl-1,3-cyclohexanedione
2,5-hexanedione (acetonyl acetone)
2,3-butanedione
Ethylacetoacetate
Cyclohexanone
Methylisobutyl ketone
Salicyladehyde
Benzohydroxamic acid
Ethylenediamine tetraacetic acid
Oxalic acid
Malonic acid
Glycine
Ethylenediamine
Polyphosphoric acid
8-hydroxy quinoline
2,2'-bipyridine
Ascorbic acid
Biguanide
4-hydroxy-4-methyl-pentanone-2
2,2,6,6-tetramethyl-3,5-heptanedione
Tropolone
O-hydroxyacetophenone.

It is interesting to note that when 2,4-hexanedione (acetonyl acetone) is used at 20 times longer contact time as in Example 1, it exhibits marked catalytic activity. However, the rate is of a different order of magnitude lower than the $\beta$-diketones, which are preferred. Likewise, as can be seen from the above table, the $\alpha$-diketones, here exemplified by 2,3-butanedione, are also ineffective under these conditions. Furthermore, from the showing of no activity for the compound 2,2,6,6-tetramethyl-3,5-heptanedione, it can be seen that there must be a methyl group adjacent to at least one of the carbonyl groups.

EXAMPLE 5

A series of test runs were conducted to observe the effect of $H_2SO_4$ in the aqueous absorbent stream using the above-described apparatus. The results which are set out in Table IV shows that unless the $H_2SO_4$ concentration is maintained at below about 40%, the degree of $SO_2$ removal falls off quite rapidly. In particular, it was found that at the end of 10 minutes treating time, the degree of $SO_2$ removal was as follows:

TABLE IV

| Absorbent Acid Conc. (% wt.) | $SO_2$ Removal (% vol.) |
|---|---|
| 25 | 63 |
| 35 | 42 |
| 70 | 2 |

Experimental conditions for the runs were as follows:
Absorbent: $H_2SO_4$, 25 ml, 25° C.
Feed: 4000 ppm $SO_2$, 10% $O_2$, 89.6% $N_2$, 1.0 liter/minute STP
Catalyst: 300 ppm $Mn^{+2}$ using acetylacetone as ligand source at ligand ratio of 4:1.

In conducting the above-described tests of the process of the invention, it was observed that the degree of $SO_2$ removal declined with time thus requiring the addition of additional ligand from time to time to restore the activity of the absorbent. It was interesting to note that the introduction of additional $Mn^{+2}$ to the operating system had no effect on restoring activity of the chelate. Likewise, any loss in catalytic activity to oxidize $SO_2$ was not recovered by extended aeration of the system. Though the reason for deactivation of the chelate is not fully understood, it appears to be the result of a change in the chemical character of the ligand as the result of reaction occurring in the presence of both $SO_2$ and $O_2$. However, loss in activity may also occur from volatilization of the ligand from the treating solution.

I claim:

1. A process for the removal of $SO_2$ from an oxygen-containing gas stream comprising contacting the gas stream with liquid water containing dispersed therein a catalytic amount of a chelate of manganese$^{+2}$ and a $\beta$-diketone whereby the $SO_2$ is oxidized to $SO_3$ which is absorbed into the water thus forming sulfuric acid, the concentration of sulfuric acid dissolved in the water being less than about 40% by weight, basis total solution, and the $\beta$-diketone corresponding to the structure

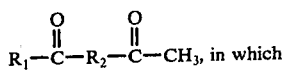
in which $R_1$ is a $C_{1-10}$ hydrocarbyl radical selected from the group consisting of alkyl, cycloalkyl, aryl, aralkyl, alkaryl and $C_{2-4}$ alkylene which when covalently bonded to a carbon atom from $R_2$ forms a cycloalkyl ring and $R_2$ is a bivalent hydrocarbyl radical selected from the group consisting of methylene and ethylidene and separating the unabsorbed gas from the absorbent.

2. The process of claim 1 in which the concentration of sulfuric acid dissolved in water is below about 20% by weight.

3. The process of claim 1 in which the mole ratio of β-diketone to manganese is at least 1.

4. The process of claim 1 in which the mole ratio of β-diketone to manganese is at least 4.

5. The process of claim 1 in which the β-diketone is acetylacetone.

6. The process of claim 1 in which the gas/liquid contacting is conducted countercurrently.

7. The process of claim 6 in which the oxygen-containing gas is passed as a discontinuous phase of finely divided bubbles through a continuous phase of the absorbent liquid.

8. The process of claim 1 in which the β-diketone is 3-methyl-2,4-pentanedione.

* * * * *